June 21, 1960  C. W. VAN RANST  2,941,766
RESILIENT MOUNTING
Filed Jan. 31, 1958
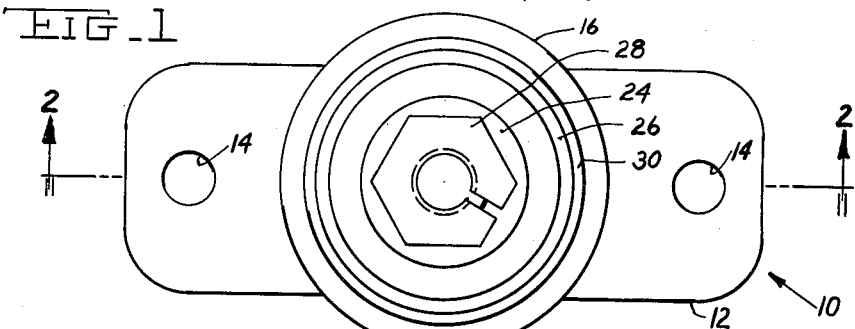
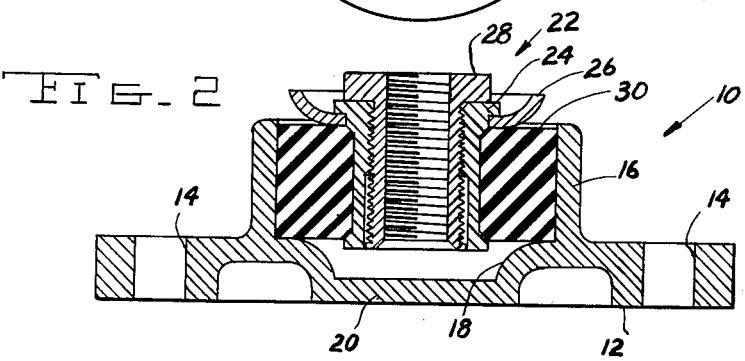
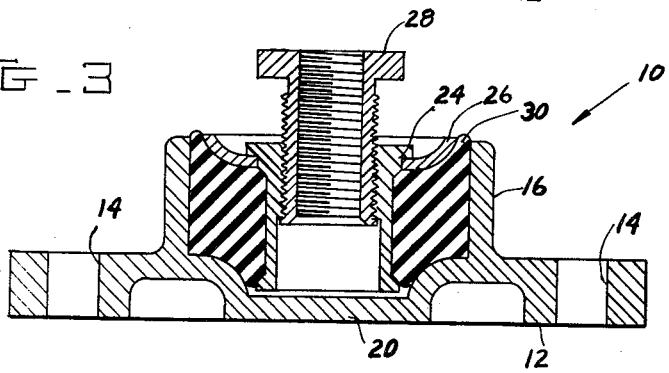
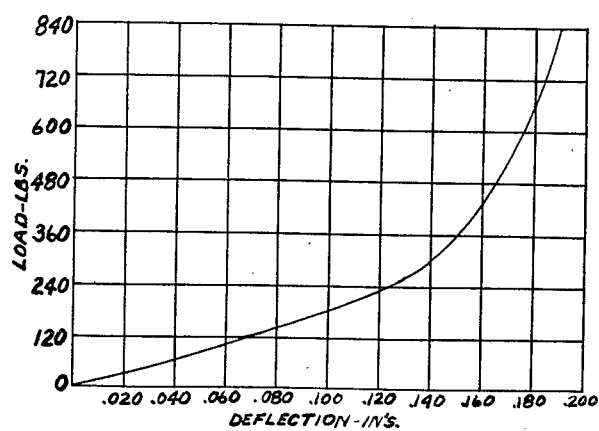
INVENTOR.
CORNELIUS W. VAN RANST
BY
FINN G. OLSEN
ATTORNEY

United States Patent Office 2,941,766
Patented June 21, 1960

2,941,766
RESILIENT MOUNTING

Cornelius W. Van Ranst, 15692 Woodland Drive, Dearborn, Mich.

Filed Jan. 31, 1958, Ser. No. 712,563

8 Claims. (Cl. 248—10)

The present invention relates to a resilient mounting, and more particularly to such a mounting which is adapted for use in carrying a marine engine, or the like.

It is an object of the present invention to provide a resilient mounting for marine engines and the like, which is constructed and arranged so that the permitted deflection will vary at a predetermined rate as a function of the load applied.

It is another object of the present invention to provide a resilient mounting of the foregoing character wherein the deflection decreases as the load increases.

It is another object of the present invention to provide a resilient mounting of the foregoing character which is characterized by its simple construction and low cost.

It is still another object of the present invention to provide a resilient mounting of the foregoing character wherein the load applied to the mounting is carried in shear through an annular rubber-like disk and deflection of the rubber causes a variation in the deflection-characteristics of the mounting, whereby as the load becomes greater the ability of the rubber to yield diminishes.

It is still another object of the present invention to provide a resilient mounting of the foregoing character wherein variation in deflection-characteristics of the mounting is acquired by varying the effective cross section of the rubber disk that is placed in shear when varying the load imposed thereon.

It is still another object of the present invention to provide a resilient mounting which has a stop to prevent overloading the rubber disk.

Other objects of this invention will appear in the following description and appended claims, reference being had to the accompanying drawings forming a part of this specification wherein like reference characters designate corresponding parts in the several views.

In the drawings:

Figure 1 is a top plan view of a resilient mounting embodying one form of the present invention;

Figure 2 is a section taken on the line 2—2 of Figure 1 when the resilient mounting is not carrying a load;

Figure 3 is a view similar to that of Figure 2 but wherein an adjustment mechanism is shown in a different position from that shown in Figure 2 and with the annular rubber disk deflected as when a load is applied; and Figure 4 is a graph showing the relationship of the load applied and the corresponding deflection of the mounting when a load is applied.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the present invention will be given. The resilient mounting 10 has a base member 12 which may have any desired number of holes 14 for use in securing the base member 12 to a suitable supporting structure (not shown). Rising up from the base member 12 is an annular collar 16. Extending radially inwardly from the base of the collar 16 is a flange 18, which initially is normal to the surface of the collar 16 and thereafter is turned downwardly and away from a horizontal plane extending through the base of said collar 16. The terminal end of the flange 18 is closed by a web 20, for a reason to be explained hereafter.

Extending into the collar 16 and in coaxial relationship therewith is a rod assembly 22 which is adapted to be connected to a marine engine or similar structure which is to be supported upon the supporting structure (not shown). The rod assembly 22 includes a sleeve 24, a flange 26 and an externally threaded inner sleeve 28 which is adapted to be screwed into the sleeve 24 to provide a vertical adjustment member for use in properly aligning the marine engine (not shown). Thus, the inner sleeve member 28 may be raised to the position shown in Figure 3, or it may be lowered to the position shown in Figure 2. These are the extreme ends of its allowable vertical adjustment, and it can be located in any position between these extremes.

The flange 26 extends radially outwardly from the sleeve 24 and is curved or flared upwardly as can be seen in Figures 2 and 3. In the illustrated embodiment, the radially outwardly extending flange 26 and the radially inwardly extending flange 18 are each shaped in the form of a segment of a circle and each segment has the same radius. Furthermore, the flange 26, at its base, is directed outwardly normal to the axis of the sleeve 24.

Positioned between the collar 16 and the sleeve 24 and seated between the base of outwardly directed flange 26 and the base of inwardly directed flange 18 is an annular rubber-like disk 30. The latter has been inserted in the illustrated position by a pre-loading operation so that it is in a state of compression, and rubber cement is not required between the inner surface of the disk 30 and the sleeve 26 or between the outer surface of disk 30 and the inner surface of collar 16 for holding the disk member 30 in place. In its normal unloaded condition, the resilient mounting 10 will be in the position shown in Figure 2. As can be seen, the entire load, when applied, will be transmitted through the annular rubber-like disk 30 from the rod assembly 22 to the base member 12. Since the load will initially be transferred from the base of the outwardly directed flange 26 to the annular disk 30 and from the annular disk 30 to the base of inwardly directed flange 18, it will be understood that the major portion of the rubber disk 30 will be placed in a condition of shear. As the load is increased the annular rubber-like disk 30 will be deflected downwardly and larger portions of the flanges 26 and 18 will engage the upper and lower surfaces respectively of the annular disk 30. This will have the effect of reducing the portion of the annular disk 30 which will be placed in shear. When the maximum load is applied, the annular rubber-like disk 30 will be deflected downwardly until it has reached the position shown in Figure 3. In this position there is substantially no yield to the resilient mounting because the flanges 26 and 18 together with the collar 16 and the sleeve 24 now completely enclose the resilient rubber-like disk 30. Since rubber is substantially incompressible, and since there is no position into which the rubber can flow, the extent of downward travel of the rod assembly 22 has been stopped. However, in order to prevent a complete fracturing of the resilient mounting 10 in the event of an overload, the webbing 20 has been extended across the lower end of the opening formed by the terminal end of the annular flange 18, thereby forming a safety stop for the resilient mounting 10.

It will be observed that the shapes of the flanges 18 and 26 provide a very effective way for controlling the amount of deflection that can occur as a result of applying any given load. In the present embodiment of the invention the flanges 26 and 18 have portions close to their bases which are substantially normal to the axis of the sleeve 24 and collar 16. Thus, at the outset, the deflection that occurs for loads that are applied at uniformly increasing increments will be substantially uniform. However, by virtue of the fact that the flanges 26 and 18 are turned away from one another, a progressively smaller portion of the annular rubber-like disk 30 is placed in shear resulting in progressively less deflection occurring. Thus, at the lower extreme of its movement, none of the disk 30 is in shear, but instead, disk 30 is entirely in a state of compression. Thus, as the load increases, the deflection decreases and the rubber-like disk 30 can carry heavier loads without damage to itself.

It is not necessary that the resilient mounting be adjustable, but if desired the inner sleeve 28 can be moved axially relative to the sleeve 24 merely by relative rotation between these parts. It will also be understood that other resilient mountings can be manufactured having different curvatures for the flanges 26 and 18 which will result in different yield characteristics for the resilient mounting and will provide a variation of the deflection-load curve illustrated in Figure 4.

Having thus described my invention, I claim:

1. A resilient mounting comprising a base member having a collar projecting from one of its surfaces, a rod assembly extending into said collar in spaced relation thereto, said collar having a radially inwardly extending flange-like portion and said rod assembly including a radially outwardly extending flange-like portion, said flange-like portions having uniformly curved overlapping surfaces which diverge from one another and with the free end of each flange-like portion substantially overlapping the base of the other flange-like portion, the base of each flange-like portion being substantially perpendicular to the surface from which it projects, and an annular rubber-like flat disk carried between said collar and rod assembly and engaging the base of each flange-like portion.

2. A resilient mounting comprising a base member having a collar projecting from one of its surfaces, a sleeve extending into one end of said collar in spaced relation thereto, a flange-like portion extending radially inwardly from the other end of said collar and curved downwardly away from said one end, said sleeve having a flange-like portion positioned above the first-named portion and extending radially outwardly and curved upwardly, the free ends of each of said flange-like portions substantially overlapping the base ends of the other of said flange-like portions, and an annular rubber-like flat disk carried between said collar and said sleeve and engaging the base of each flange-like portion.

3. A resilient mounting comprising a base member having a collar projecting from one of its surfaces, a sleeve extending into one end of said collar in spaced relation thereto, an annular flange-like portion extending radially inwardly from the other end of said collar and curved downwardly away from said one end, said sleeve having an annular flange-like portion positioned above the first-named portion and extending radially outwardly and curved upwardly, said flange-like portions substantially completely overlapping one another, and an annular pre-loaded rubber-like flat disk carried between said collar and said sleeve in a state of compression and engaging the base of each flange-like portion and adapted to engage the remainder of each flange-like portion progressively as said flange-like portions are moved axially toward one another.

4. A resilient mounting comprising a base member having a collar projecting from one of its surfaces, a sleeve extending into one end of said collar in spaced relation thereto, an annular flange-like portion extending radially inwardly from the other end of said collar and curved downwardly away from said one end, said sleeve having an annular flange-like portion positioned above the first-named portion and extending radially outwardly and curved upwardly, said flange-like portions substantially completely overlapping one another, an annular pre-loaded rubber-like flat disk carried between said collar and said sleeve in a state of compression and engaging the base of each flange-like portion and adapted to engage the remainder of each flange-like portion progressively as said flange-like portions are moved axially toward one another, and an adjustment member axially movable in said sleeve to vary the effective height of the resilient mounting.

5. A resilient mounting as defined in claim 4 wherein the curved surfaces of said flange-like portions are segments of a generally circular shape having substantially the same radius.

6. A resilient mounting comprising a base member adapted to be secured to a supporting structure and having a collar projecting from its upper surface, a cylindrical member adapted to be connected to a device for supporting the same and projecting axially downward into said collar in spaced relation thereto, said collar and said cylindrical member each having a flange-like portion extending toward the other in substantially complete overlapping relation to one another, at least one of said flange-like portions being turned axially away from the other, and a rubber-like annular flat disk retained in pre-loaded condition between said collar and said cylindrical member and between the bases of said flange-like portions so that when said cylindrical member is progressively depressed the portion of the annular disk that is subject to a shearing action will be progressively decreased at a rate governed by the shape of said flange-like portions.

7. A resilient mounting as claimed in claim 6 wherein a web closes the opening formed by the terminal edge of the flange-like portion extending from said collar, thereby limiting the extent of downward movement of said cylindrical member.

8. A resilient mounting as claimed in claim 6 wherein both flange-like portions have surfaces including segments of circles of substantially the same radii.

References Cited in the file of this patent

UNITED STATES PATENTS

| | | |
|---|---|---|
| 2,126,707 | Schmidt | Aug. 16, 1938 |
| 2,147,660 | Loewus | Feb. 21, 1939 |
| 2,457,749 | Thiry | Dec. 28, 1948 |

FOREIGN PATENTS

| | | |
|---|---|---|
| 621,693 | Great Britain | Apr. 14, 1949 |
| 801,707 | France | May 23, 1936 |